(12) United States Patent
Tripathi et al.

(10) Patent No.: US 9,191,551 B2
(45) Date of Patent: Nov. 17, 2015

(54) PIXEL NORMALIZATION

(75) Inventors: Brijesh Tripathi, San Jose, CA (US);
Nitin Bhargava, San Jose, CA (US);
Craig M. Okruhlica, San Jose, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 13/404,765

(22) Filed: Feb. 24, 2012

(65) Prior Publication Data

US 2013/0223733 A1   Aug. 29, 2013

(51) Int. Cl.
*G06K 9/40*      (2006.01)
*H04N 1/60*      (2006.01)

(52) U.S. Cl.
CPC ........................................ *H04N 1/60* (2013.01)

(58) Field of Classification Search
None
See application file for complete search history.

(56) References Cited

U.S. PATENT DOCUMENTS

| | | | |
|---|---|---|---|
| 5,617,092 A * | 4/1997 | Pace .............................. | 341/159 |
| 5,903,361 A * | 5/1999 | Shiau et al. ................... | 358/3.03 |
| 6,212,293 B1 * | 4/2001 | Yamamoto ..................... | 382/168 |
| 6,750,994 B1 * | 6/2004 | Yamamoto ..................... | 358/522 |
| 7,477,323 B2 | 1/2009 | Chou | |
| 7,737,930 B2 | 6/2010 | Inuzuka et al. | |
| 7,936,359 B2 | 5/2011 | Spangler et al. | |
| 8,411,938 B2 * | 4/2013 | Zhang et al. .................. | 382/162 |
| 2002/0003543 A1 * | 1/2002 | Deering ......................... | 345/581 |
| 2003/0067979 A1 * | 4/2003 | Takahashi et al. ........ | 375/240.03 |
| 2005/0152582 A1 | 7/2005 | Yoon et al. | |
| 2005/0219574 A1 * | 10/2005 | Ok et al. ......................... | 358/1.9 |
| 2005/0278611 A1 * | 12/2005 | Park et al. ..................... | 714/792 |
| 2007/0057955 A1 * | 3/2007 | McKay ......................... | 345/550 |
| 2008/0192130 A1 * | 8/2008 | Noh .............................. | 348/243 |
| 2008/0204481 A1 * | 8/2008 | Mostinski ..................... | 345/690 |
| 2009/0128455 A1 * | 5/2009 | McKay ........................... | 345/60 |
| 2009/0169102 A1 * | 7/2009 | Zhang et al. .................. | 382/167 |
| 2010/0215283 A1 | 8/2010 | Ono | |
| 2011/0206280 A1 * | 8/2011 | Lee ............................... | 382/167 |
| 2012/0018518 A1 * | 1/2012 | Strom et al. ............. | 235/462.04 |
| 2012/0206468 A1 * | 8/2012 | Bratt et al. .................... | 345/547 |
| 2012/0206474 A1 * | 8/2012 | Holland et al. ............... | 345/589 |

FOREIGN PATENT DOCUMENTS

WO    WO 2006115315 A1 * 11/2006

* cited by examiner

*Primary Examiner* — Tsung-Yin Tsai
(74) *Attorney, Agent, or Firm* — Rory D. Rankin; Meyertons, Hood, Kivlin, Kowert & Goetzel, P.C.

(57) ABSTRACT

Methods and apparatuses for performing lossless normalization of input pixel component values. The apparatus includes a normalization unit for converting pixel values from a range of 0 to $(2^N-1)$ to a normalized range from 0.0 to 1.0. The step size between adjacent values of the normalized range is $1/(2^N-1)$, and a maximum input value of $(2^N-1)$ corresponds to a normalized value of 1. The normalization unit divides each input pixel component value by $(2^N-1)$ in order to preserve the fidelity of the color information contained in the input pixel component value.

18 Claims, 8 Drawing Sheets

PIXEL NORMALIZATION

BACKGROUND

1. Field of the Invention

The present invention relates generally to graphics information processing, and in particular to methods and mechanisms for normalizing pixel component values.

2. Description of the Related Art

Computing devices with displays usually include different types of graphics functionality to manipulate and display video and images. Graphics hardware and software can perform many different types of operations to generate and process images intended for a display. One common type of operation is a pixel normalization operation. Pixel normalization is often performed to convert pixel values into a range from 0.0 to 1.0. Normalization is often performed prior to a color space conversion on the pixel data from a first color space to a second color space. A color space may be defined as a mathematical representation of a set of colors.

Typically, pixel normalization introduces a small error into the normalized pixel value. For example, if an 8-bit value is used to represent a pixel color, the value is in a range from 0 to 255. The maximum value of 255 is used to represent full color intensity, which should correspond to a normalized value of 1.0. However, in a typical graphics processing system, the 8-bit pixel value is normalized by dividing by 256. Therefore, the full color value of 255 does not get converted to a normalized value of 1.0, but instead becomes 255/256 (or 0.99609375).

Referring now to FIG. 1, a normalization of pixel values performed by a prior art normalization unit is shown. The input pixel values processed by normalization unit 10 may be N-bit values, and the input pixel values range from 0 to $(2^N-1)$, with a step size of 1. Normalization unit 10 normalizes the input values by dividing each input pixel value by $2^N$, which results in a range of normalized values from 0 to $(2^N-1)/2^N$, with a step size of $1/2^N$. However, in the input pixel representation, a value of $(2^N-1)$ represents a full color intensity value of 1.0 on a normalized scale, and so an error is introduced in the normalization process implemented by normalization unit 10. As is shown in FIG. 1, the input pixel component value range does not map to a normalized value of 1.0.

As long as only linear functions are utilized to process and/or manipulate values normalized by unit 10, then this error introduced by the normalization process may be corrected for at a later point by applying a correction factor. However, if a non-linear function were applied to the values generated by unit 10, then the normalization errors would be irreversible.

SUMMARY

Systems, apparatuses, and methods for performing pixel normalization on an input stream of pixel data are contemplated. Values may be normalized by a normalization unit such that the maximum value represented by an N-bit number is mapped to 1.0. In one embodiment, the normalization unit may be part of a graphics processing pipeline. In one embodiment, a discrete N-bit number representing a pixel value in the range of 0 to $(2^N-1)$ may be converted by the normalization unit to the range of 0.0 to 1.0. In some embodiments, the normalization unit may remove an offset from the input pixel value, depending on the type of color space represented by the input pixel value.

In one embodiment, the stage preceding the normalization unit in the graphics processing pipeline may be a scaler unit. The subsequent stage after the normalization unit in the graphics processing pipeline may be a color space conversion unit. A color space conversion may be performed on the normalized pixel values generated by the normalization unit. In one embodiment, gamma functions may be applied to the normalized pixel values. The gamma functions may utilize a non-linear power function to manipulate/process the normalized pixel values. Prior to writing the output pixel values to memory, the output pixel values may be denormalized, or reformatted in a reformatting stage of the pipeline. The reformatting unit may reverse the normalization step performed by the normalization unit. The reformatting unit may convert the normalized values back to the original range of values from 0 to $(2^N-1)$.

For an N-bit pixel value that is received by the normalization unit, the normalization unit may divide the value by $(2^N-1)$. In one embodiment, the division may be performed by shifting the input value left by N bits, then adding the input value plus one to this shifted value. In other embodiments, division by $(2^N-1)$ may be performed in any of a variety of different manners. To perform the multiplication in the reformatting unit, the input value may be multiplied by $2^N$, and then the input value may be subtracted from this product. Multiplying by $2^N$ may be performed by shifting the input value left by N bits.

The normalization unit may include two configuration registers for setting an input offset value and an input divisor value. The normalization unit may be configured via these two registers. The reformatting unit may include two configuration registers for setting an output offset value and an output divisor value, and the reformatting unit may be configured via these two registers.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
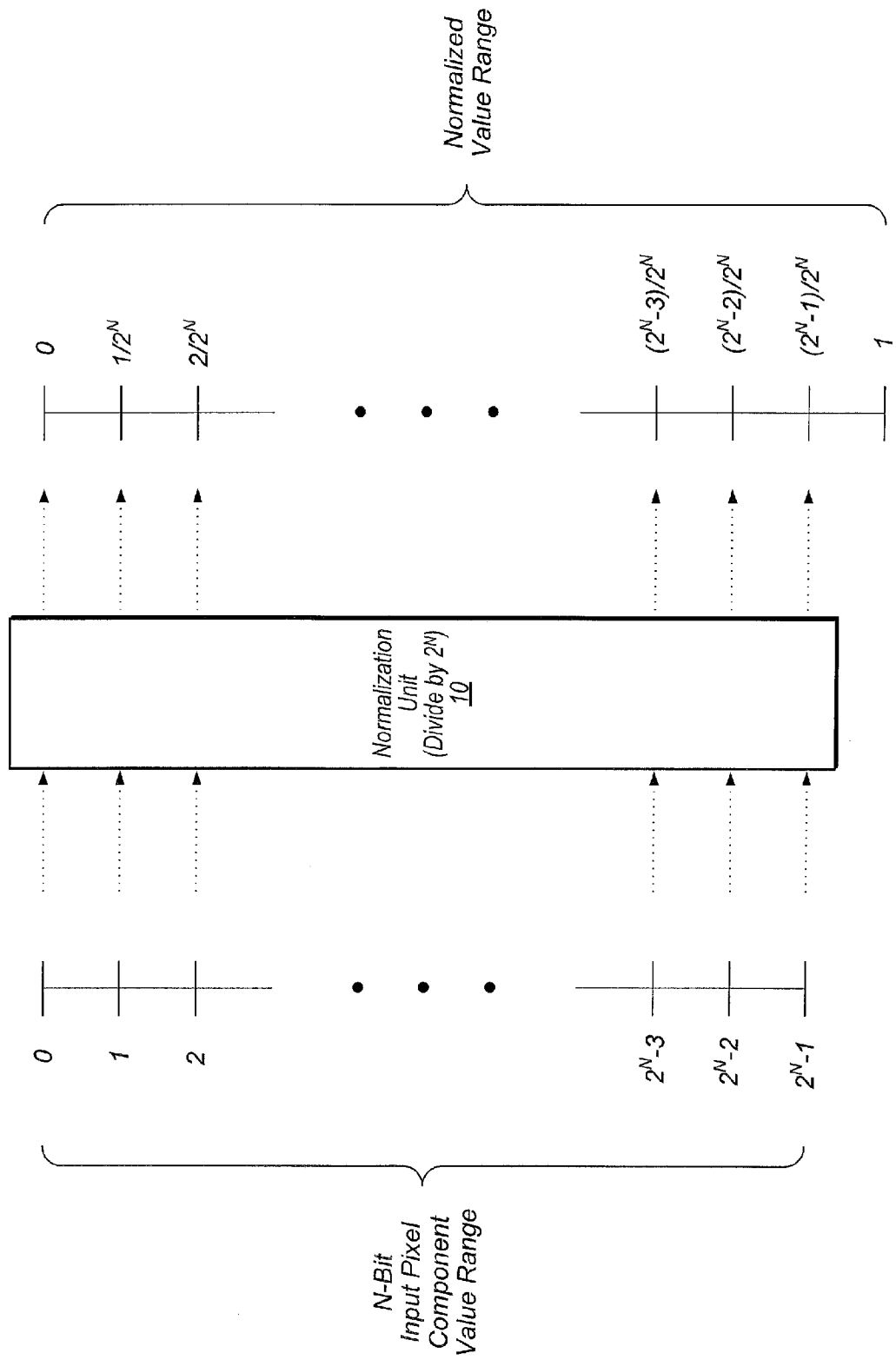
FIG. 1 illustrates one embodiment of a mapping of input pixel component values to normalized values performed by a prior art normalization unit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a normalization unit . . . ." Such a claim does not foreclose the apparatus from including additional components (e.g., a processor, a cache, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

Figure 2:
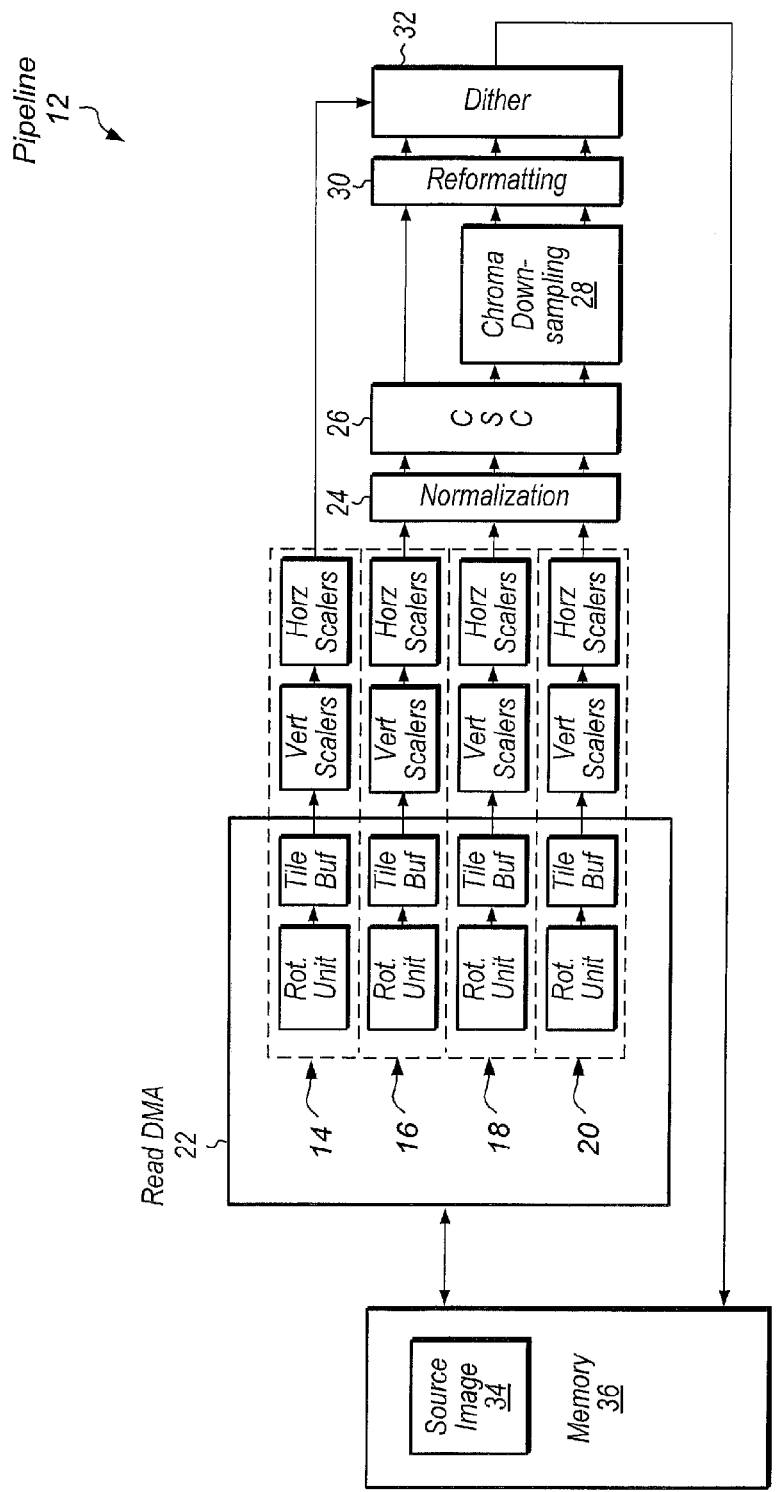
FIG. 2 is a block diagram that illustrates one embodiment of a graphics processing pipeline.

Referring now to FIG. 2, a block diagram illustrating one embodiment of a graphics processing pipeline is shown. In various embodiments, pipeline 12 may be incorporated within a system on chip (SoC), an integrated circuit (IC), an application specific integrated circuit (ASIC), an apparatus, a processor, a processor core or any of various other similar devices. In one embodiment, pipeline 12 may be a separate processor chip or co-processor. In some embodiments, pipeline 12 may deliver graphics data to a display controller or display device (not shown). In other embodiments, the graphics processing pipeline may deliver graphics data to a storage location in memory, for further processing or for later consumption by a display device. In some embodiments, two or more instances of pipeline 12 may be included within a SoC or other device.

Source image 34 may be stored in memory 36, and source image 34 may be a still image or a frame of a video stream. In other embodiments, source image 34 may be stored in other locations. Source image 34 is representative of any number of images, videos, or graphics data that may be stored in memory 36 and processed by pipeline 12. Memory 36 is representative of any number and type of memory devices (e.g., dynamic random access memory (DRAM), cache).

Source image 34 may be represented by large numbers of discrete picture elements known as pixels. In digital imaging, the smallest item of information in an image or video frame may be referred to as a "pixel". Pixels are generally arranged in a regular two-dimensional grid. Each pixel in source image 34 may be represented by one or more pixel components. The pixel components may include color values for each color in the color space in which source image 34 is represented. For example, the color space may be a red-green-blue (RGB) color space. Each pixel may thus be represented by a red component, a green component, and a blue component. In one embodiment, the value of a color component may range from zero to $(2^N-1)$, wherein 'N' is the number of bits used to represent the value. The value of each color component may represent a brightness or intensity of the corresponding color in that pixel. Other color spaces may also be used, such as YCbCr. Furthermore, additional pixel components may be included. For example, an alpha value for blending may be included with the RGB components to form an ARGB color space. The number of bits used to store each pixel may depend on the particular format being utilized. For example, pixels in some systems may require 8 bits, whereas pixels in other systems may require 10 bits, and so on, with various numbers of bits per pixel being used in various systems.

Pipeline 12 may include four separate channels 14-20 to process up to four color components per pixel. Each channel may include a rotation unit, a set of tile buffers, a set of vertical scalers, and a set of horizontal scalers. In one embodiment, channel 14 may process an alpha channel. In other embodiments, channel 14 may not be utilized, and instead only three channels 16-20, corresponding to three color components, may be utilized. The read direct memory access (RDMA) unit 22 may be configured to read graphics data (e.g., source image 34) from memory 36. RDMA unit 22 may include four rotation units, four tile buffers, and a DMA buffer (not shown). The four tile buffers may be utilized for storing rotated tiles of source image 34.

There may be a plurality of vertical scalers and horizontal scalers for each color component of the source image. Each set of vertical scalers may fetch a column of pixels from the corresponding set of tile buffers. In another embodiment, pixels may be conveyed to the vertical scalers from the tile buffers. Each set of vertical scalers per channel may include any number of vertical scalers. In one embodiment, there may be four separate vertical scalers within pipeline 12 for each color component channel. In other embodiments, other numbers of vertical scalers may be utilized per color component channel.

Source image 34 may be partitioned into a plurality of tiles and may be processed by the rotation units on a tile-by-tile basis, and tiles that have been rotated may be stored in one of the tile buffers in a respective color component channel. In one embodiment, there may be four tile buffers per channel, although in other embodiments, other numbers of tile buffers may be utilized. In one embodiment, the vertical scalers may fetch a column of pixels from corresponding tile buffers. The column of pixels may extend through one or more tiles of the source image.

Source image 34 may be partitioned into tiles, and in one embodiment, the tiles may be 16 rows of pixels by 128 columns of pixels. However, the tile size (e.g., 256-by-24, 64-by-16, 512-by-32) may vary in other embodiments. The width of source image 34 may be greater than the width of the tile such that multiple tiles may be utilized to make up each row of source image 34. Also, the length of source image 34 may be greater than the length of the tile such that multiple tiles may be utilized to make up each column of source image 34.

Each vertical scaler may be configured to generate a vertically scaled pixel on each clock cycle and convey the pixel to a corresponding horizontal scaler. In one embodiment, there may be four separate horizontal scalers within the pipeline for each color component channel, while in other embodiments, other numbers of horizontal scalers may be utilized per color component channel. In various embodiments, there may be a horizontal scaler corresponding to each vertical scaler within each color component channel of pipeline 12. Each horizontal scaler may generate horizontally scaled pixels from the received pixels. As shown in FIG. 2, the horizontal scalers in channel 14 are coupled to dither unit 32. In one embodiment, channel 14 may process an alpha channel and the outputs of the horizontal scalers in channel 14 may be conveyed to dither unit 32.

In each color component channel, the horizontal scalers may output vertically and horizontally scaled pixels to normalization unit 24. In one embodiment, normalization unit 24 may be configured to convert received pixel values to the range between 0.0 and 1.0. For example, in one embodiment, the pixel values generated by the horizontal scaler may be in a 10.4 format, with 10 integer bits and 4 fractional bits. The 10-bit integer portion of the pixel component values output from a horizontal scaler may take on values from 0 to 1023. In such an embodiment, normalization unit 24 may divide each pixel component value received from the horizontal scaler by 1023 to normalize the value. Any remaining fractional bits may be utilized for rounding. In other embodiments, normalization unit 24 may divide by other values depending on the number of bits used to represent pixel values. Also, normalization unit 24 may be configured to remove an optional offset from one or more of the pixel values.

Normalization unit 24 may convey normalized pixel values to color space conversion (CSC) unit 26. CSC unit 26 may be configured to convert between two different color spaces. In various embodiments, the CSC unit may perform a color space conversion of the graphics data it receives. For example, in one embodiment, pixel values may be represented in source image 34 by a RGB color space. In this embodiment, pipeline 12 may need to generate output images in a YCbCr color space, and so CSC unit 26 may convert pixels from the RGB color space to the YCbCr color space. Various other color spaces may be utilized in other embodiments, and CSC unit 26 may be configured to convert pixels in between these various color spaces. In some embodiments, when a color space conversion is not required, CSC unit 26 may be a passthrough unit.

In various embodiments, CSC unit 26 may include logic to perform de-gamma operations on the pixel data prior to converting between two color spaces. Also, CSC unit 26 may include functionality to perform re-gamma operations after performing the color space conversion. The de-gamma and re-gamma operations may be utilized to adjust for the non-linear effects of various display devices that may be utilized to display the pixel data in source image 34. In another embodiment, the de-gamma and re-gamma operations may be performed external to CSC unit 26.

In one embodiment, CSC unit 26 may convey pixels to chroma downsampling unit 28. Chroma downsampling unit 28 may be configured to downsample the chroma components of the pixels in an inline, buffer-free fashion. Various types of downsampling may be performed (e.g., 4:2:2, 4:2:0). For example, in one embodiment, if the source image is in a 4:4:4 format and if the destination image is specified to utilize a 4:2:0 structure, then chroma downsampling unit 28 may perform vertical and horizontal downsampling of the chroma pixel components of the source image. In some scenarios, chroma downsampling unit 28 may be a passthrough unit if downsampling of the chroma pixel components is not needed.

Chroma downsampling unit 28 may be coupled to reformatting unit 30. Reformatting unit 30 may be configured to reverse the normalization that was performed by normalization unit 24. Accordingly, the pixel values may be returned to the previous range of values that were utilized prior to the pixels being normalized by normalization unit 24. In one embodiment, reformatting unit 30 may multiply the normalized pixel values by $2^N$ and then subtract the normalized value from the resultant product. In this way, the normalized pixel values may be returned to the original format of values between 0 and ($2^N-1$). Reformatting unit 30 may be configured via two configuration registers containing an output offset value and an output divisor value.

Pixels may pass through dither unit 32 after being reformatted, and dither unit 32 may insert noise to randomize quantization error. The output from dither unit 32 may be the processed destination image. In various embodiments, the processed destination image may be written to a frame buffer, to memory 36, to a display controller, to a display, or to another location. In other embodiments, graphics processing pipeline 12 may include other stages or units and/or some of the units shown in FIG. 2 may be arranged into a different order. Pipeline 12 is one example of a graphics processing pipeline and the methods and mechanisms described herein may be utilized with different types of other graphics processing pipelines.

It is noted that other embodiments may include other combinations of components, including subsets or supersets of the components shown in FIG. 2 and/or other components. While one instance of a given component may be shown in FIG. 2, other embodiments may include two or more instances of the given component. Similarly, throughout this detailed description, two or more instances of a given component may be included even if only one is shown, and/or embodiments that include only one instance may be used even if multiple instances are shown.

Figure 3:
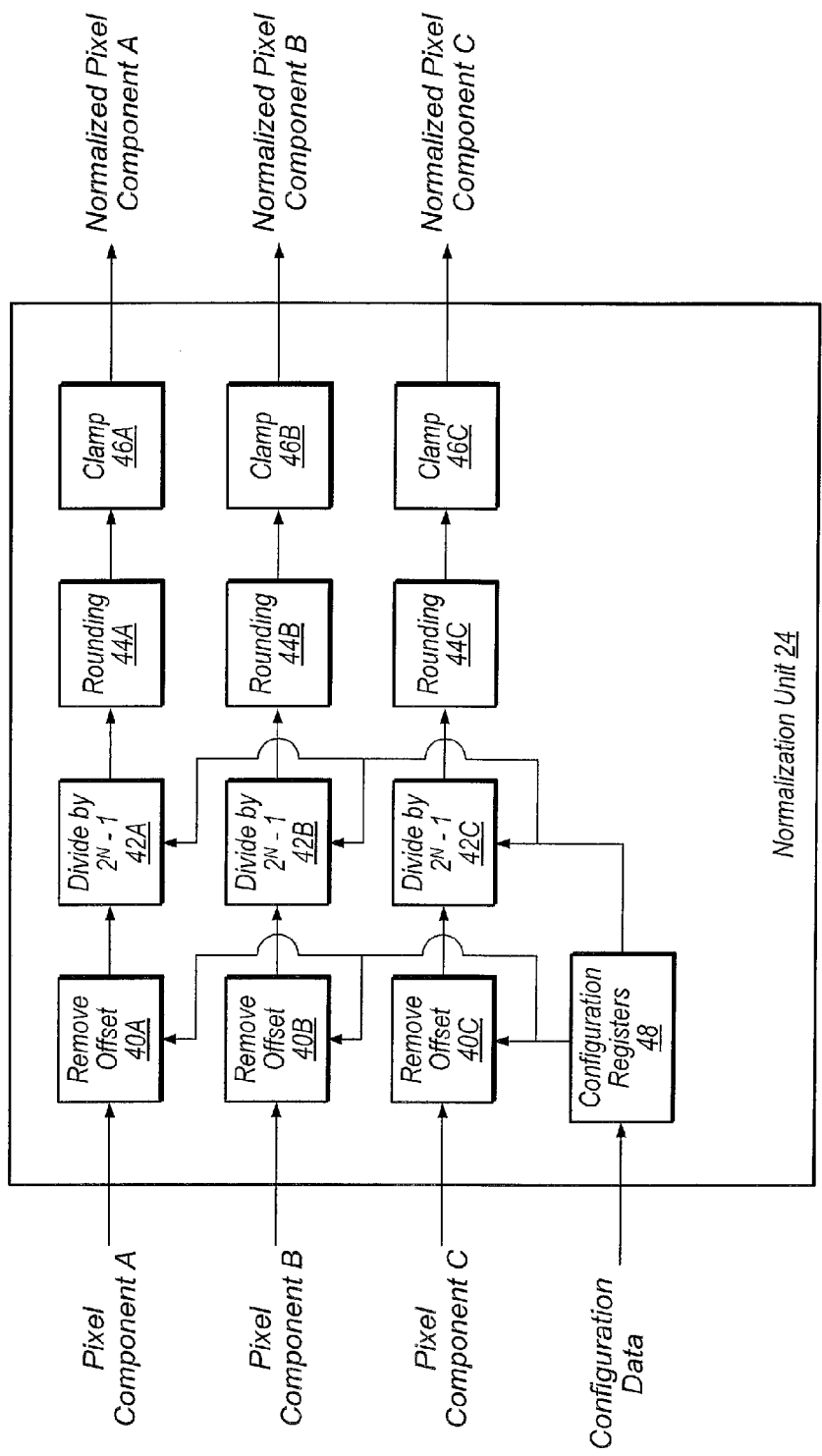
FIG. 3 is a block diagram illustrating one embodiment of a normalization unit.

Turning now to FIG. 3, a block diagram of one embodiment of a normalization unit is shown. Normalization unit 24 may utilize a lossless normalization operation to normalize the values received for the three pixel components A, B, and C. Pixel components A, B, and C may correspond to the three different color components of the pixel data of a source image. The three different color components may vary depending on which color space is being used to represent the pixel data. For example, the RGB color space may be utilized in one embodiment, and pixel components A, B, and C may correspond to red, green, and blue pixel data, respectively. In another example, the YCbCr color space may be utilized, and pixel components A, B, and C may correspond to Y (luma), Cb (blue), and Cr (red) pixel components, respectively. Alternatively, pixel components A, B, and C may be assigned to the color space components in other manners. Also, other color spaces may be utilized in other embodiments. In addition, in other embodiments, fewer than or greater than three pixel components may be processed by normalization unit 24.

The pixel components A-C may be conveyed to normalization unit 24 by a prior stage of a graphics processing pipeline. In one embodiment, the prior stage may be a horizontal scaler unit, and multiple pixel values of each component A-C may be conveyed per clock cycle. In other embodiments, the previous stage may be any of a variety of other pipeline stages. Also, in further embodiments, normalization unit 24 may be a standalone unit, or utilized by a processor, co-processor, SoC, or other device on an as-needed basis. In these embodiments, pixel components A-C may be conveyed from memory directly to normalization unit 24.

Pixel component A represents a stream of pixel data, and one or more pixel component values may be received in each clock cycle by normalization unit 24. In one embodiment, an offset may be removed from each pixel component A value in unit 40. For example, in one color space, pixels may be defined using an extended gamut format, where the values may include an offset and may range from 0.0 to 2.0. In this color space, a 10-bit format may define a value of 384 as a normalized value of 0.0 and a value of 895 may be defined as a normalized value of 1.0. To normalize these pixel component values, first the offset of 384 may be subtracted out, and then since there are 511 steps between 384 (representing 0.0) and 895 (representing 1.0), the result may be divided by 511. Other color spaces may utilize other offset values that need to be subtracted out prior to performing division.

In other embodiments, an offset may not be included as part of the pixel component value of pixel component A, and therefore unit 40 may be bypassed, optional, or a passthrough unit. Unit 40 may be configured based on the value of an input offset register in configuration registers 48. Normalization unit 24 may be configured to remove offsets from pixel components B and C in a similar manner.

Next, each pixel component A-C may pass through a divide unit 42A-C, respectively, which may divide the input value by $(2^N-1)$. Divide unit 42 may be implemented using any of a variety of divide architectures, with one example described in further detail in FIG. 5. The value of an input divisor register in configuration registers 48 may be coupled to divide units 42A-C to provide the appropriate divisor value $(2^N-1)$. After divide unit 42 has divided the input pixel component value by $(2^N-1)$, then the value may pass through a rounding unit 44. In another embodiment, rounding may be implemented as part of the divide unit 42. For example, rounding may be implemented within each divide unit 42 by adding a rounding component, instead of utilizing rounding unit 44.

After rounding unit 44, the pixel components A-C may pass through clamp unit 46, to clamp pixel component values that exceed a maximum value or fall below a minimum value. The output from clamp unit 46 may be the normalized pixel component value, which may be conveyed to a next stage of the graphics processing pipeline, to memory, to a display or display controller, or to another location. In one embodiment, the output values generated by the normalization unit may be represented by a 3.14 value, wherein '3' is the integer portion of the value, and '14' is the fractional portion of the value. In other embodiments, other types of representations may be utilized for the values generated by normalization unit 24. In one embodiment, gamma functions may be applied to the normalized pixel values generated by normalization unit 24. In other embodiments, other non-linear transformations may be performed on the values generated by normalization unit 24.

The configuration registers 48 may be programmable and may contain configuration data, such as pixel input offset and pixel input divisor values that may be utilized to configure remove offset unit 40 and divide unit 42, respectively. In one embodiment, there may be a separate register for the pixel input offset value and a separate register for the pixel input divisor value.

It should be understood that the distribution of functionality illustrated in FIG. 3 and described is not the only acceptable normalization unit, and other normalization units may include fewer or more components and a different arrangement of functionality among the components.

Figure 4:
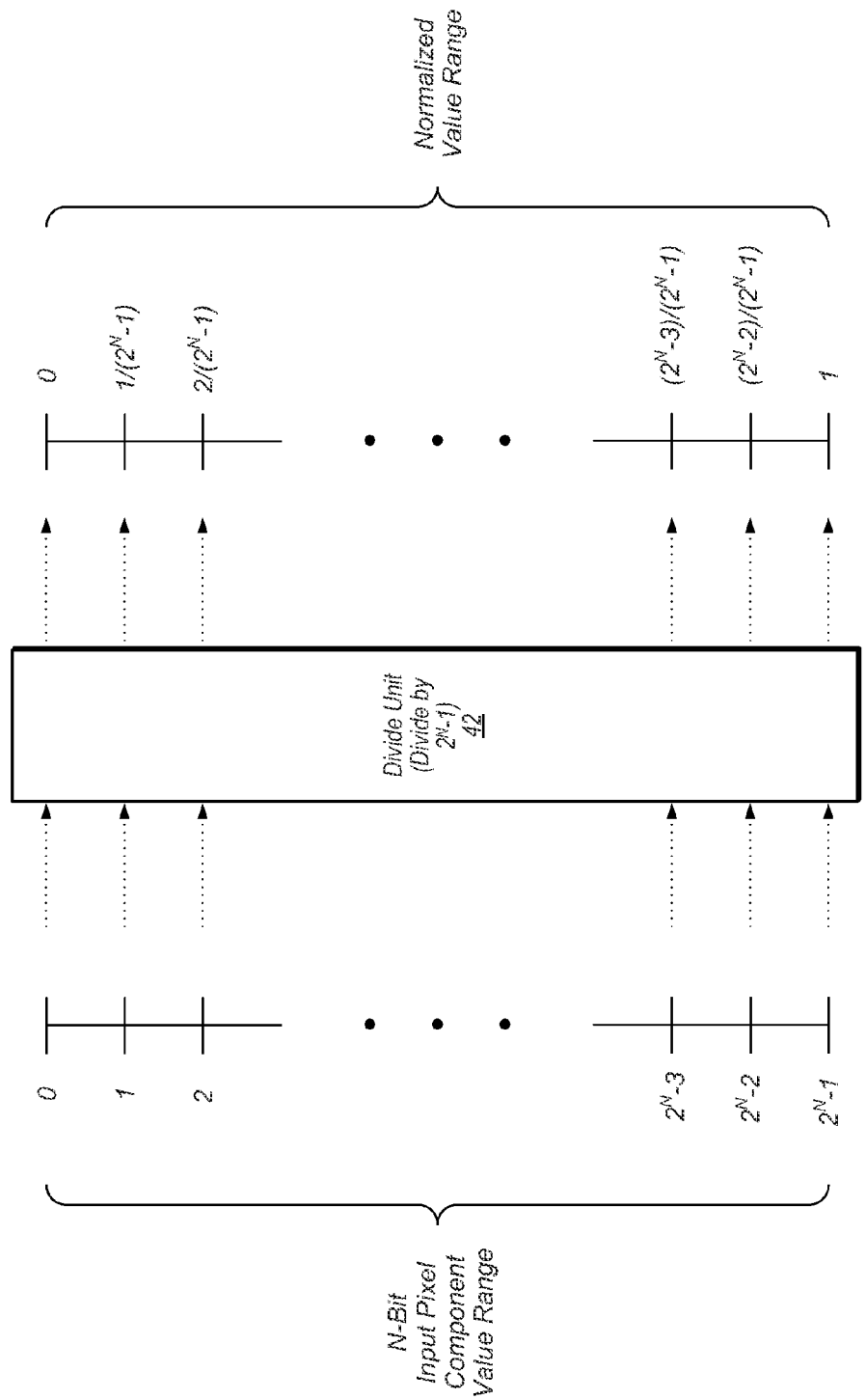
FIG. 4 illustrates one embodiment of a mapping of input pixel component values to normalized values.

Turning now to FIG. 4, one embodiment of a mapping of input pixel component values to normalized values is shown. In one embodiment, the N-bit input pixel component value range may be from 0 to $(2^N-1)$, with a step size of 1. In other embodiments, other input pixel component ranges may be utilized. Divide unit 42 may perform lossless normalization by dividing an input pixel value by $(2^N-1)$, which generates values in the normalized value range of 0.0 to 1.0, with a step size of $1/(2^N-1)$. As is shown in FIG. 4, the mapping of the input pixel range covers the entire normalized range from 0.0 to 1.0. For example, an input value of 0, which may represent an absence of color, maps to a normalized value of 0 and an input value of $(2^N-1)$, which may represent a full color intensity value, maps to a normalized value of 1. Also, the step size between adjacent normalized values is $1/(2^N-1)$. This is in contrast to the prior art normalization mapping (shown in FIG. 1) which produces a step size between adjacent normalized values of $\frac{1}{2^N}$.

For example, for input pixel components represented by 8-bit numbers, the input pixel components may range in value from 0 to 255. The value of 255 represents a full color intensity and corresponds to a normalized value of 1.0. A lossless normalization performed by divide unit 42 divides each input pixel values by 255, and so the normalized value for an original full pixel value of 255 would be 1. In general, input pixel values in the range of 0 to $(2^N-1)$ may be mapped to the entirety of the normalized range of 0.0 to 1.0 by divide unit 42. The mapping may be lossless in regard to preserving the precision of the color intensity of the input pixel values.

Figure 5:
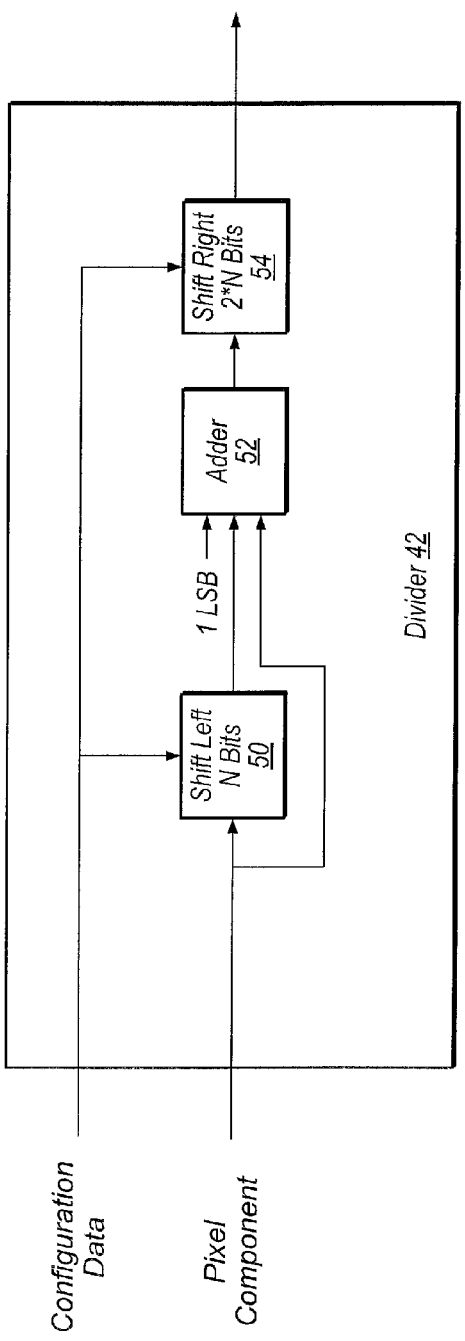
FIG. 5 is a block diagram that illustrates one embodiment of a divider.

Referring now to FIG. 5, one embodiment of a divider is shown. Divider 42 may be configured to divide input pixel components by a divisor of $(2^N-1)$. In one embodiment, divide units 42A-C (of FIG. 3) may contain the components shown in FIG. 5. In other embodiments, divide units 42A-C may use other components and architectures to perform division.

Generally speaking, performing true division in processors can be relatively complex and time consuming. On the other hand, multiplying and dividing by powers of two can be relatively straightforward. In order to take advantage of this feature of modern processors, a simplification of a true divide operation may be performed based on the following property of dividing by $(2^N-1)$:

$$\frac{x}{(2^N-1)} = \frac{x}{2^N} + \frac{x}{(2^N)^2} + \frac{x}{(2^N)^3} + \dots$$

Therefore, to simplify the resultant divide operation, the above equation may be approximated by the following:

$$\frac{x}{(2^N-1)} \sim = \frac{(2^N * x) + x + 1}{(2^N)^2}$$

$$\frac{x}{(2^N-1)} \sim = ((x<<8) + x + 1) >> 16$$

The plus one term acts like a rounding term and helps reduce error and achieve a value of 1.0 for $(2^N-1)/(2^N-1)$. This formula may be utilized without any appreciable error for the range of values that is typically used to represent input pixel values. For example, this technique may be used to implement a divide-by-511, a divide-by-1023, and so on.

For the implementation illustrated in FIG. 5, the input pixel component may be represented by 'N' bits. The N-bit input pixel component may be received by divider 42 and then may be shifted left 'N' bits in unit 50. Configuration data may be received by unit 50 which indicates the value of N, and the value of N may be used to shift the input pixel component left by the appropriate number of bits. Then, the shifted version of the input pixel component may be added to the original version of the input pixel component and '1' in adder 52. For example, if the input pixel component is an 8-bit number, the '1' value may be a 16-bit number with a '1' in the LSB and the rest of the bits '0' (i.e., 0x0001).

The output from adder 52 may be shifted right by 2*N bits in unit 54. For example, if the input pixel component is an 8-bit number, than unit 54 may right-shift the sum produced by adder 52 by 16 bits. Instead of performing a conventional right-shift operation which could result in lost bits, unit 54 may instead be seen to shift the decimal point (i.e., radix point) left by 2*N bits to retain the precision of the original value. Configuration data indicating the value of 'N' may be coupled to unit 54 to enable unit 54 to effectively shift the radix point left by the appropriate number of bits.

The arrangement of components shown in divider 42 may be used to divide input pixel components by $(2^N-1)$ and produce quotients which are accurate for the number of bits that are used to represent the quotient. Although not shown in FIG. 5, in another embodiment, a rounding component may be coupled as an input to adder 52 to implement rounding functionality.

Figure 6:
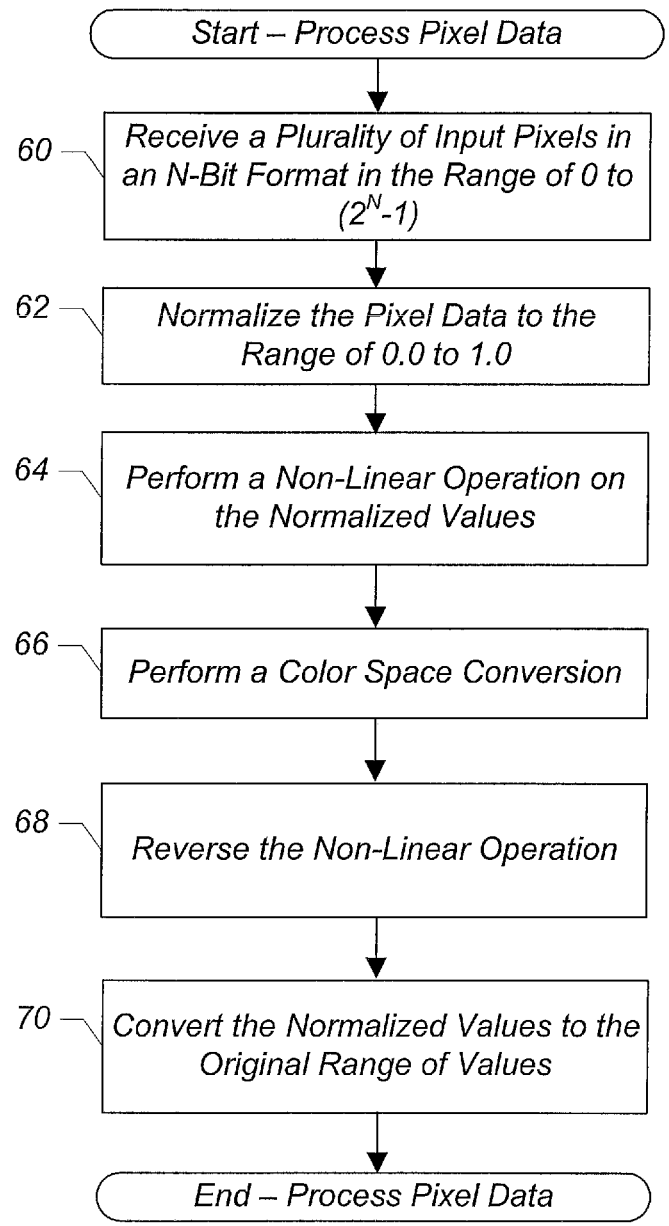
FIG. 6 is a generalized flow diagram illustrating one embodiment of a method for processing pixel data values.

Turning now to FIG. 6, one embodiment of a method for processing pixel data values is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, pixel data may be received in an N-bit format by a normalization unit (block 60). The N-bit format may represent values in a range from 0 to $(2^N-1)$. The pixel data may be converted to normalized values in a range of 0.0 to 1.0 (block 62). The conversion may be performed by dividing each received pixel data value by $(2^N-1)$. The conversion to the normalized values may be lossless and the step size between adjacent normalized values may be $1/(2^N-1)$. The conversion may be considered lossless such that if the conversion were reversed, the value generated by reversing the normalization may be the same value that was received by the normalization unit. The conversion may be also considered lossless if the normalized value is a true representation of the original pixel value. For example, a maximum input pixel value of $2^N-1$ should be converted to a normalized value of 1.0 in a lossless conversion process. The other normalized values may also preserve the fidelity of the color intensity represented by the input pixel value.

After block 62, a non-linear operation may be performed on the normalized values (block 64). In one embodiment, the non-linear operation may be a de-gamma operation. After the non-linear operation has been performed, a color space conversion may be performed on the pixel values (block 66). The color space conversion may convert the pixel values from a first color space to a second color space, and the first and second color spaces may vary depending on the embodiment. Next, the non-linear operation may be reversed (block 68). In one embodiment, reversing the non-linear operation may be a re-gamma operation. After block 68, the normalized pixel values may be converted from the normalized range to the original pixel value range of 0 to $(2^N-1)$ (block 70). In one embodiment, after the pixel values have been converted back to the original pixel value range of 0 to $(2^N-1)$, the pixel values may be written back to memory.

Figure 7:
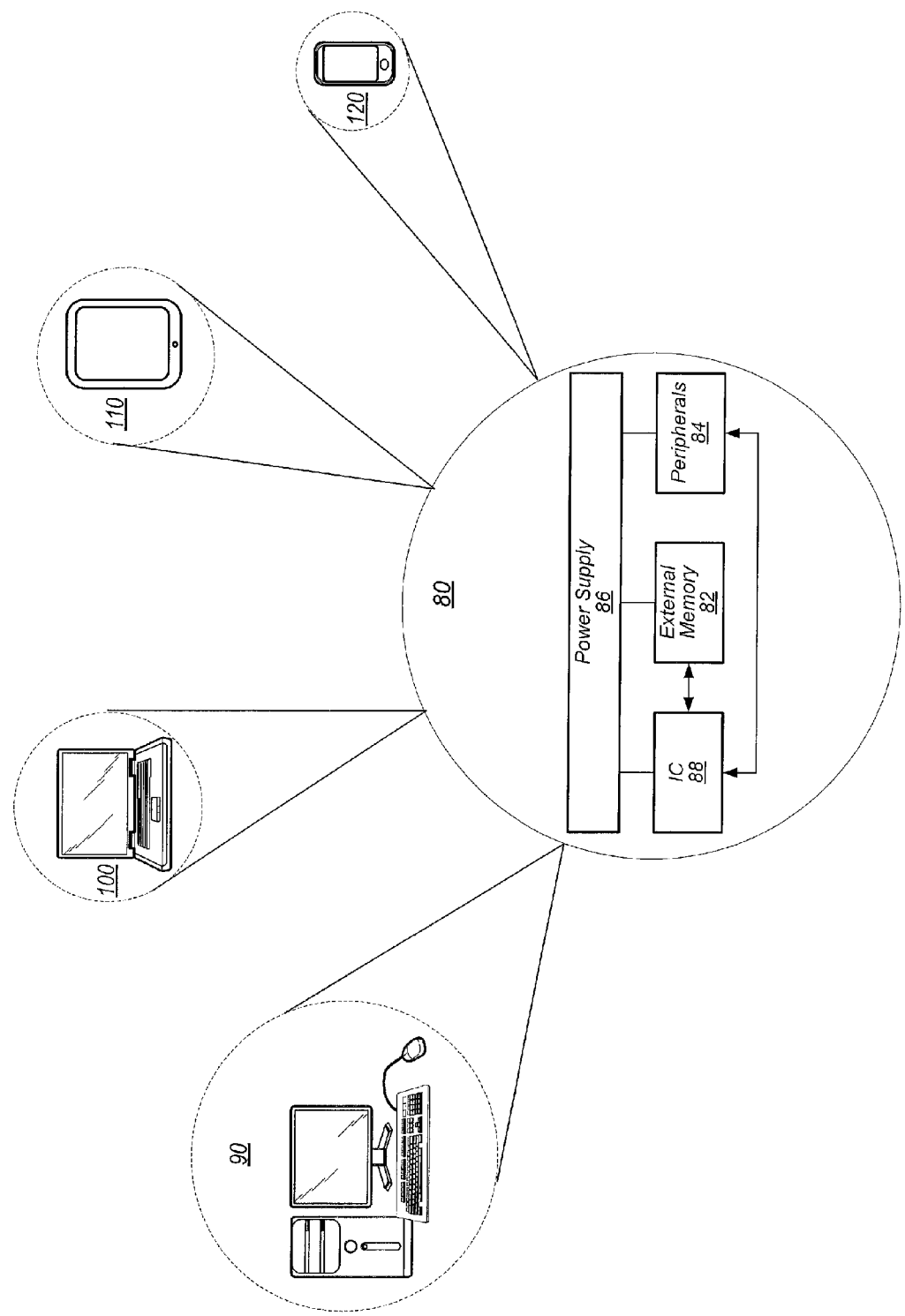
FIG. 7 is a block diagram of one embodiment of a system.

Referring next to FIG. 7, a block diagram of one embodiment of a system 80 is shown. As shown, system 80 may represent chip, circuitry, components, etc., of a desktop computer 90, laptop computer 100, tablet computer 110, cell phone 120, or otherwise. In the illustrated embodiment, the system 80 includes at least one instance of an integrated circuit (IC) 88 coupled to an external memory 82. IC 88 may include one or more instances of graphics processing pipeline 12 (of FIG. 1). In some embodiments, IC 88 may be a SoC with one or more processors and one or more graphics processing pipelines.

IC 88 is coupled to one or more peripherals 84 and the external memory 82. A power supply 86 is also provided which supplies the supply voltages to IC 88 as well as one or more supply voltages to the memory 82 and/or the peripherals 84. In various embodiments, power supply 86 may represent a battery (e.g., a rechargeable battery in a smart phone, laptop or tablet computer). In some embodiments, more than one instance of IC 88 may be included (and more than one external memory 82 may be included as well).

The memory 82 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 88 in a chip-on-chip configuration, a package-on-package configuration, or a multi-chip module configuration.

The peripherals 84 may include any desired circuitry, depending on the type of system 80. For example, in one embodiment, peripherals 84 may include devices for various types of wireless communication, such as wifi, Bluetooth, cellular, global positioning system, etc. The peripherals 84 may also include additional storage, including RAM storage, solid state storage, or disk storage. The peripherals 84 may include user interface devices such as a display screen, including touch display screens or multitouch display screens, keyboard or other input devices, microphones, speakers, etc.

Figure 8:
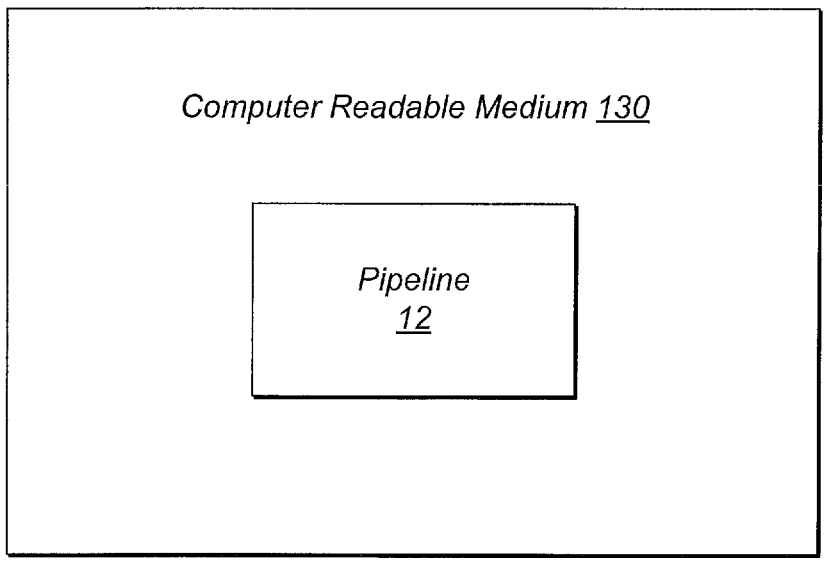
FIG. 8 is a block diagram of one embodiment of a computer readable medium.

Turning now to FIG. 8, one embodiment of a block diagram of a computer readable medium 130 including one or more data structures representative of the circuitry included in pipeline 12 (of FIG. 2) is shown. Generally speaking, computer readable medium 130 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 130 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 130 may be the netlist(s) (with or without the synthesis library) or the data set(s), as desired. In yet another alternative, the data structures may comprise the output of a schematic program, or netlist(s) or data set(s) derived therefrom.

While computer readable medium 130 includes a representation of pipeline 12, other embodiments may include a representation of any portion or combination of portions of pipeline 12 (e.g., normalization unit 24, reformatting unit 30).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A graphics processing pipeline comprising:
   a memory access unit configured to read pixel data from a memory;
   a pixel normalization unit comprising circuitry configured to:
     receive a stream of pixel values, wherein each pixel value is represented by an N-bit binary number representing one of $2^N$ distinct values, wherein N is an integer;
     convert each pixel value from an original pixel value to a normalized value within the normalized range of 0.0 and 1.0, wherein each distinct value of the pixel values maps to a distinct value in the normalized range, and wherein the normalized value 1.0 maps to a distinct value of the pixel values, wherein the normalization unit is configured to convert each pixel by dividing each pixel value by $(2^N-1)$;
   a reformatting unit comprising circuitry configured to reverse normalize the pixel values such that an original pixel value of each pixel is obtained, wherein reversing said normalization comprises:
     multiplying a normalized value of a given pixel by n to generate a product and then subtracting the normalized value of the given pixel from the product; and
     adding an offset value, in response to determining said pixel corresponds to a colorspace with an extended gamut; and
   circuitry configured to generate an image based on pixel values that have been normalized and reverse normalized.

2. The graphics processing pipeline as recited in claim 1, wherein the normalization unit is configured to convert each pixel value to a normalized value by:
   shifting the pixel value left by N bits;
   adding the pixel value and one to the shifted pixel value to generate a sum; and
   shifting the sum right by a number of bits equal to two multiplied by N.

3. The graphics processing pipeline as recited in claim 1, wherein a previous stage of the graphics processing pipeline comprises a plurality of horizontal scalers, and wherein the plurality of horizontal scalers are configured to convey a stream of N-bit pixel values to the normalization unit.

4. The graphics processing pipeline as recited in claim 1, wherein a subsequent stage of the graphics processing pipeline is a color space conversion unit, and wherein the normalization unit is configured to convey normalized values to the color space conversion unit.

5. A normalization unit comprising:
   circuitry configured to convert an N-bit pixel component value, wherein N is an integer, from an original value in an input range of 0 to $(2^N-1)$ to a normalized value in an output range of 0.0 to 1.0;
   circuitry configured to reverse the normalized value in order to restore the original value;
   wherein the conversion is performed by dividing the N-bit pixel component value by $(2^N-1)$, and wherein reversing the converted value is performed by:
     multiplying a normalized value of a given pixel by $2^N$ to generate a product and then subtracting the normalized value of the given pixel from the product; and
     adding an offset value, in response to determining said pixel corresponds to a colorspace with an extended gamut; and
   circuitry configured to convey pixel values that have been normalized and reverse normalized for use in generating an image.

6. The normalization unit as recited in claim 5, wherein the normalization unit is further configured to remove an offset from the N-bit pixel component value prior to converting the N-bit pixel component value to a normalized value.

7. The normalization unit as recited in claim 5, wherein a step size of one in the input range corresponds to a step size of $1/(2^N-1)$ in the output range.

8. The normalization unit as recited in claim 5, wherein the normalization unit is further configured to receive three separate pixel components corresponding to three color components.

9. The normalization unit as recited in claim 5, wherein the conversion maps the input range onto the entire output range.

10. The normalization unit as recited in claim 5, wherein the conversion preserves a fidelity of a color intensity represented by the N-bit pixel component value.

11. The normalization unit as recited in claim 5, wherein dividing the N-bit pixel component value by $(2^N-1)$ is performed by one or more bit shift and add operations.

12. A method comprising:
   receiving pixel data in an N-bit format, wherein the N-bit format represents values in a range from 0 to $(2^N-1)$, wherein N is an integer; and
   converting the pixel data from original values in the range of 0 to $(2^N-1)$ to normalized values in a normalized range of 0.0 to 1.0, wherein the conversion is lossless, and wherein a step size between adjacent normalized values is $1/(2^N-1)$;
   wherein converting the pixel data to normalized values comprises dividing each pixel value by $(2^N-1)$;
   reversing normalization of the pixel data, such that an original pixel value of each pixel is obtained, wherein reversing said normalization comprises:

multiplying a normalized value of a given pixel by $2^N$ to generate a product and then subtracting the normalized value of the given pixel from the product; and adding an offset value, in response to determining said pixel corresponds to a colorspace with an extended gamut; and generating an image based on pixel values that have been normalized and reverse normalized.

13. The method as recited in claim 12, wherein converting said pixel values to normalized values comprises:

shifting the pixel value left by N bits;

adding the pixel value and one to the shifted pixel value to generate a sum; and shifting the sum right by a number of bits equal to two multiplied by N.

14. The method as recited in claim 12, wherein a maximum input pixel data value of $(2^N-1)$ is converted to a normalized value of 1.0.

15. The method as recited in claim 12, further comprising performing a non-linear operation on the normalized values.

16. The method as recited in claim 15, further comprising:

performing a color space conversion on the normalized values subsequent to performing the non-linear operation;

reversing the non-linear operation on the normalized values; and converting the normalized values from the normalized range of 0.0 to 1.0 to N-bit values in a range from 0 to $(2^N-1)$.

17. The method as recited in claim 16, wherein the non-linear operation is a de-gamma operation and wherein reversing the non-linear operation is a re-gamma operation.

18. A method comprising:

receiving pixel data in an N-bit format, wherein the N-bit format represents values in a range from 0 to $(2^N-1)$, wherein N is an integer; and converting the pixel data from original values in a range of 0 to $(2^N-1)$ to normalized values in a normalized range of 0.0 to 1.0, wherein the conversion is lossless, and wherein a step size between adjacent normalized values is $1/(2^N-1)$;

wherein converting said pixel values to normalized values comprises:

shifting the pixel value left by N bits;

adding the pixel value and one to the shifted pixel value to generate a sum; and shifting the sum right by a number of bits equal to two multiplied by N;

reversing normalization of the pixel data, such that an original pixel value of each pixel is obtained, wherein reversing said normalization comprises:

multiplying a normalized value of a given pixel by $2^N$ to generate a product and then subtracting the normalized value of the given pixel from the product; and adding an offset value, in response to determining said pixel corresponds to a colorspace with an extended gamut; and generating an image based on pixel values that have been normalized and reverse normalized.

* * * * *

UNITED STATES PATENT AND TRADEMARK OFFICE
CERTIFICATE OF CORRECTION

PATENT NO. : 9,191,551 B2  
APPLICATION NO. : 13/404765  
DATED : November 17, 2015  
INVENTOR(S) : Tripathi et al.

Page 1 of 1

It is certified that error appears in the above-identified patent and that said Letters Patent is hereby corrected as shown below:

In the Claims:

Claim 1, column 11, line 55, please delete "pixel by n", and substitute -- pixel by $2^N$ --.

Signed and Sealed this  
Eighth Day of March, 2016

Michelle K. Lee  
*Director of the United States Patent and Trademark Office*